E. H. HAND.
TONE ARM FOR TALKING MACHINES.
APPLICATION FILED NOV. 5, 1919.
1,345,487.
Patented July 6, 1920.
Fig. 1.
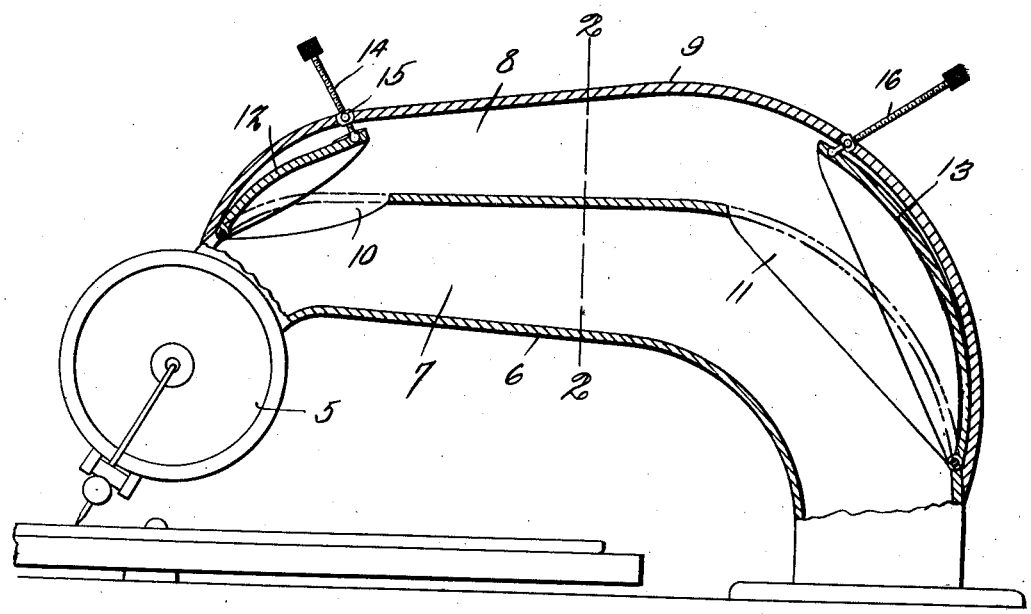
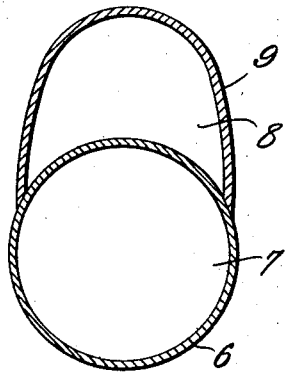
Fig. 2.
INVENTOR
Ele H. Hand,
BY
Henry G. Burrington,
ATTORNEY

UNITED STATES PATENT OFFICE.

ERLE H. HAND, OF BALTIMORE, MARYLAND.

TONE-ARM FOR TALKING-MACHINES.

1,345,487.  Specification of Letters Patent.  Patented July 6, 1920.

Application filed November 5, 1919. Serial No. 335,835.

*To all whom it may concern:*

Be it known that I, ERLE H. HAND, a citizen of the United States, residing at Baltimore, State of Maryland, have invented certain new and useful Improvements in Tone-Arms for Talking-Machines, of which the following is a specification.

This invention relates to talking machine tone arms, and its object is to provide the same with an auxiliary sound passageway in communication with the main sound passageway, and a means for closing said auxiliary passageway to prevent the escape thereinto of the sound waves passing through the main passageway, whereby it is made possible to vary the tones issuing from the machine.

The object stated is attained by means of a novel combination and arrangement of parts to be hereinafter described and claimed, and in order that the same may be better understood, reference is had to the accompanying drawing forming a part of this specification, and while the preferred embodiment of the invention has been disclosed, it will be understood that various changes and modifications may be made without a departure from the spirit and scope of the invention as claimed hereinafter.

In the drawing, Figure 1 is an elevation of the invention, partly in section, and Fig. 2 is a cross-section on the line 2—2 of Fig. 1.

Referring specifically to the drawing, 5 denotes the sound box or reproducer of a talking machine, the same being carried by a tone arm 6 as usual by which the sound is conducted to the horn or other amplifier (not shown).

The tone arm 6 has a main sound passageway 7 and an auxiliary sound passageway 8 located above the latter. The wall 9 forming the auxiliary passageway is joined to the wall of the tone arm at the top thereof, and in the latter wall are openings or ports 10 and 11, respectively. The opening 10 establishes communication between the two passageways at their forward ends, or the ends nearest the sound box, whereas the opening 11 establishes communication between the passageways at their rear ends.

The opening or port 10 is provided with a closure in the form of a pivoted valve or gate 12 so that it may be closed to cut off the passageway 8 from the passageway 7, and the opening 11 has a similar valve or gate 13. These gates are shaped so that when they are closed they seat in the respective openings to effect a complete closure. When thus seated, the gates form continuations of the wall of the main passage 7 containing the ports 10 and 11, so that the continuity of said wall is now uninterrupted, and no obstructions are presented to interfere with the passage of the sound waves through said passage. It will also be noted that when the gates are swung back into the passage 8, they serve to deflect the sound waves, the gate 12 deflecting said waves into the auxiliary passage 8, and the gate 13 deflecting the waves back into the main passage 7.

The valve 12 has an operating stem 14 extending from the passageway 8, and threaded through a nut 15 swiveled in an aperture in the wall 9. A similar screw stem 16 is provided for operating the valve 13. Both valves swing upward into the passageway 8 when they are opened.

When the valves 12 and 13 are open, some of the sound waves in the main passageway 7 escape through the opening 10 and travel through the passageway 8 to the opening 11, where they pass back into the main passageway. By operating the valves 12 and 13 it is made possible to vary the tonal quality of the instrument. By closing one or both valves the vibrations from an over-toned sound box or reproducer are reduced, and where harsh tones are produced they can be softened.

I claim:

A talking machine tone arm carrying a sound box and having main and auxiliary sound passages, the wall of the main passage having ports establishing communication between said passage and the auxiliary passage, one of the ports being at the end of the tone arm carrying the sound box, and the other port being located at the outlet end of the tone arm, and closures for the ports adapted to seat therein to close the same, and when thus seated said closures forming continuations of the wall of the main passage in which the ports are located, to maintain an uninterrupted continuity of said wall, and said closures being operable to swing into the auxiliary passage and open the ports and act as sound wave deflectors, the closure for the port adjacent to the sound box end of the tone arm opening away from the direction of the sound waves and deflecting into the auxiliary passage, and the other closure closing transversely of the sound waves and facing said waves when open for deflecting the same from the auxiliary passage back into the main passage.

In testimony whereof I affix my signature in the presence of two witnesses.

ERLE H. HAND.

Witnesses:
E. WALTON BREWINGTON,
HOWARD D. ADAMS.